Nov. 17, 1959     W. B. JEFFREY     2,913,282
IMPROVED SERVICE, CHARGING AND QUICK SERVICE CONTROL VALVE
Filed July 19, 1956
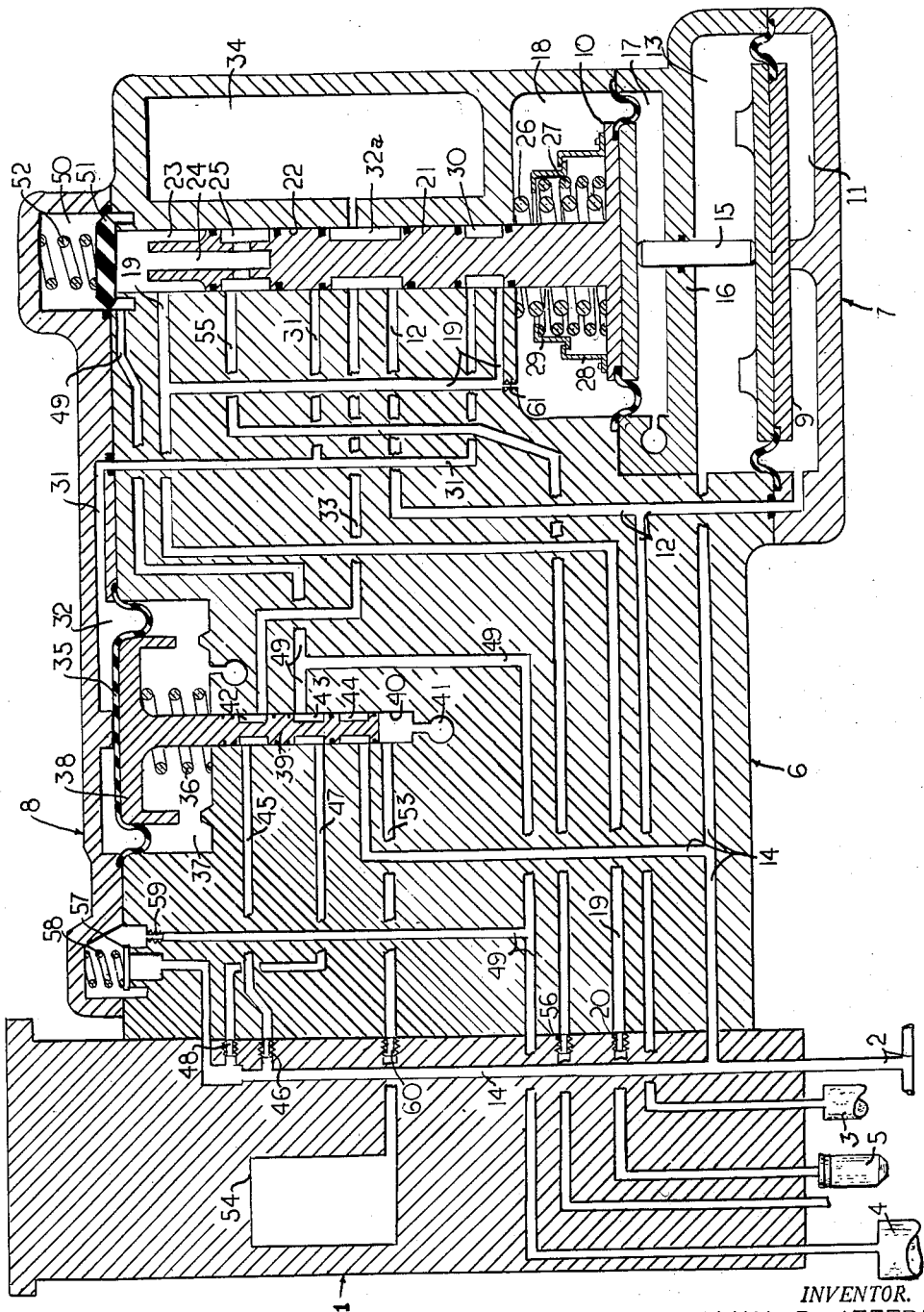
*INVENTOR.*
WILLIAM B. JEFFREY
BY
ATTORNEY United States Patent Office 2,913,282
Patented Nov. 17, 1959

2,913,282

IMPROVED SERVICE, CHARGING AND QUICK SERVICE CONTROL VALVE

William B. Jeffrey, Irwin, Pa., assignor to Westinghouse Air Brake Company, Wilmerding, Pa., a corporation of Pennsylvania Application July 19, 1956, Serial No. 598,923

12 Claims. (Cl. 303—35)

This invention relates to fluid pressure brake apparatus of the self-lapping type wherein the degree of application and release of brakes on a railway car or the like is controlled according to the degree of reduction and restoration, respectively, of pressure of fluid in a brake pipe relative to a datum pressure in a control reservoir; the invention relating more particularly to an apparatus of said type embodying an improved and simplified arrangement for controlling charging of the control reservoir and auxiliary reservoir from the brake pipe and also controlling quick service activity.

It has heretofore been proposed to provide a fluid pressure brake apparatus embodying a quick service valve device that responds to a slight, such as 0.7 pound per square inch (hereinafter abbreviated as "p.s.i."), initial reduction in brake pipe pressure below auxiliary reservoir pressure to close a control reservoir slow charge communication and then connect the brake pipe to a quick service volume for effecting a local quick service reduction in brake pipe pressure. A service valve device thereafter responds to a greater, such as 3 p.s.i., reduction in brake pipe pressure to supply fluid under pressure from the auxiliary reservoir to the brake cylinder. A combined charging and quick service cut-off valve device having a control chamber open to the brake cylinder is biased to a normal position for permitting flow through the control reservoir slow charge communication and also opening an auxiliary reservoir slow charge communication, while at the same time connecting the quick service volume to the brake cylinder; said cut-off valve device being responsive, however, to brake cylinder pressure in said control chamber in excess of a small value, such as about 2 p.s.i., to move to a cut-off position for closing said auxiliary reservoir slow charge communication, secondarily closing said control reservoir slow charge communication, and cutting off the quick service volume from the brake cylinder.

The principal object of this invention is to provide an improved, simplified and relatively inexpensive brake apparatus of the above general type in which the functions of the quick service valve device are accomplished by an improved service valve device and a combined charging and quick service control valve device, thereby permitting elimination of the separate quick service valve device heretofore used.

According to this object, the brake apparatus embodies an improved service valve device and a novel combined charging and quick service control valve device which serially control flow through a normally open control reservoir charge communication via which the usual control reservoir is opened to the brake pipe. The service valve device responds to a slight, such as 0.7 p.s.i., reduction in brake pipe pressure below control reservoir pressure to close the said communication and then supply fluid under pressure from a previously charged certain volume to a control chamber of the combined control valve device for causing the latter to operate to close an auxiliary reservoir slow charge communication, secondarily close the control reservoir charge communication and close off a quick service volume from atmosphere and then connect the quick service volume to the brake pipe for effecting a quick service reduction in brake pipe pressure.

Thus, with this improved arrangement, there is no separate quick service valve device, such as required in equipments heretofore proposed, and the functions of the quick service valve device are accomplished by the service valve device and combined charging and quick service control valve device.

According to another object of the invention, the aforementioned certain volume is preferably charged with fluid under pressure from the control reservoir via the service valve device in a brake release position so that, upon movement of said valve device to this position following an application of brakes, a slight reduction in control reservoir pressure will be effected which is sufficient to assure that said service valve device will tend to remain in said position, despite a slight fluctuation in brake pipe pressure, but which reduction is not sufficient to prevent graduated release of brakes.

Other objects and advantages will become apparent from the following more detailed description of the invention and from the accompanying drawing, wherein the single figure is a diagrammatic view of a fluid pressure brake apparatus embodying the invention.

Description

As shown in the drawing, the improved brake apparatus comprises, on each car of a train, a brake controlling valve device which, in turn, comprises a pipe bracket 1 to which are connected the usual brake pipe 2, a control reservoir 3, an auxiliary reservoir 4, and a brake cylinder 5. On one face of the pipe bracket 1 is mounted a sectionalized casing 6, within which are contained a self-lapping type service valve device 7 and a combined charging and quick service control valve device 8, which devices 7 and 8 are improved according to features of the invention hereinafter to be described.

The service valve device 7 may comprise two coaxially arranged, spaced apart movable abutments 9 and 10 of different effective areas, which are cooperably, though not positively, connected to each other so as to form a stack, as will be understood from subsequent description. The larger movable abutment 9 is subject at its under side, as viewed in the drawing, to pressure of fluid in a chamber 11 constantly open via a passage 12 to the control reservoir 3; and said movable abutment is subject at the opposite side to pressure of fluid in a chamber 13 constantly open via a passage 14 to the brake pipe 2. The movable abutment 9 is cooperably connected to the smaller movable abutment 10 through the medium of a coaxially arranged, cylindrical pusher stem 15 having sealing, slidably guided contact with the wall of an aligned bore through a casing partition 16 separating chamber 13 from an atmospheric chamber 17 at one side of movable abutment 10. At the opposite side of movable abutment 10 is a chamber 18 that is constantly open to the brake cylinder 5 via a passage 19 and a brake cylinder application choke 20.

The movable abutment 10 is positively connected to a coaxially arranged cylindrical service valve 21 that projects through chamber 18 and, adjacent its projecting end, has sealing, slidably guided contact with the wall of an aligned bore 22 open to said chamber. Adjacent its projecting end the valve 21 is of reduced diameter so as to define, in cooperation with the surrounding bore 22, an annular chamber 23 constantly open to a branch of passage 19. Extending inwardly from the projecting end of valve 21 is an axially arranged bore-like opening 24 constantly open via suitable radial ports to an elongated annular cavity 25 formed in said valve intermediate its ends.

According to the invention, two concentrically arranged helical springs 26 and 27 are disposed in chamber 18 in encirclement of the stem of valve 21. Spring 26 bears against the movable abutment 10 and end wall of chamber 18 and exerts a relatively small bias on said movable abutment, such as equivalent to about 0.7 p.s.i. of brake pipe pressure, for preventing undesired movement of the stack by reason of normal small brake pipe pressure fluctuations but permitting movement of said stack if and when brake pipe pressure in chamber 13 is reduced in excess of 0.7 p.s.i. below control reservoir pressure in chamber 11. Encircling the outer spring 27 is an annular spring cage 28 suitably connected at one end to the movable abutment 10 and having at the opposite end an inwardly directed flange which overlies an outwardly directed flange on an annular spring retainer 29 having an inwardly directed flange for engaging one end of spring 27 and thereby limiting the extent of expansion of spring 27 in the direction of chamber 23. With this arrangement, when brake pipe pressure in chamber 13 is substantially equal to control reservoir pressure in chamber 11, spring 26 will bias the stack and hence service valve 21 to a brake release position, in which it is shown in the drawing, and defined by contact of movable abutment 9 with a suitable stop formed on the end wall of chamber 11; it being noted that spring 27 will impose no bias on the stack because the retainer 29 will be out of engagement with the end wall of chamber 18.

With service valve 21 in brake release position, an elongated annular cavity 30 formed in said valve connects a branch of passage 19 with a passage 31 leading to a control chamber 32 of valve device 8 for venting the latter chamber via communication hereinafter to be described; and an elongated annular cavity 32a, formed in valve 21 intermediate the cavities 25 and 30, connects a control reservoir charging passage 33 with a volume 34 and a branch of control reservoir passage 12.

The combined charging and quick service control valve device 8 may comprise a flexible diaphragm 35 suitably clamped about its outer edge between sections of the casing and subject at one side to pressure of fluid in chamber 32 and at the opposite side to pressure of a helical bias spring 36 in an atmospheric chamber 37. The diaphragm 35 is operatively connected through the medium of a diaphragm follower 38 to a cylindrical control valve 39 having sealing, slidably guided engagement with the wall of an aligned bore 40 open at one end to chamber 37 and open at the opposite end to an atmospheric vent port 41.

According to the invention, the valve 39 has three spaced elongated annular cavities 42, 43 and 44, which cavities are sealingly isolated from each other and from the chamber 37 and port 41 by O-ring seals; the cavity 43 being intermediate the cavities 42 and 44. When chamber 32 is substantially devoid of fluid under pressure, spring 36 biases the valve 39 to a normal position, in which it is shown in the drawing, and defined by contact of diaphragm 35 with a stop formed in the end wall of chamber 32. With valve 39 in this position, cavity 42 connects passage 33 with a passage 45 constantly open to brake pipe 2 via a control reservoir charging choke 46 and a branch of brake pipe passage 14; cavity 43 connects a passage 47, that leads to a branch of brake pipe passage 14 via an auxiliary reservoir slow charge choke 48, with a passage 49, one branch of which leads to auxiliary reservoir 4 and another branch of which leads to a chamber 50 containing a preferably disc-shaped poppet-type brake cylinder supply valve 51 that is biased by a helical spring 52 into contact with an annular valve seat encircling one end of bore 22 of valve device 7; cavity 44 is exposed solely to a branch of brake pipe passage 14; and a passage 53 leading to a quick service volume 54 is uncovered past the end of valve 39 to the atmospheric port 41.

*Operation*

Assume initially that the apparatus is devoid of fluid under pressure. Under this condition, the service valve 21 of valve device 7 will be biased to its previously defined brake release position by action of spring 26, and control valve 39 of valve device 8 will be biased by spring 36 to its previously defined normal position; and consequently the various components will be in the positions in which they are shown on the drawing.

To initially charge the apparatus, fluid under pressure is supplied to the brake pipe 2 at the locomotive in the well known manner. On a particular car, some of the fluid thus supplied to the brake pipe 2 will flow via brake pipe passage 14, choke 46, passage 45 and cavity 42 of control valve 39 in normal position to passage 33, whence it will flow via cavity 32a of service valve 21 in brake release position to the volume 34 and also via branches of control reservoir passage 12 to the control reservoir 3 and chamber 11 of service valve device 7 for charging said volume, reservoir and chamber.

Meanwhile, fluid under pressure will be supplied at a substantially unrestricted rate via another branch of brake pipe passage 14 directly to chamber 13 of valve device 7 for thereby assuring that the service stack and hence the service valve 21 will be maintained in its brake release position, in which it is shown, and in which the brake cylinder 5 is opened to atmosphere via passage 19, chamber 23, opening 24, service valve cavity 25, and a brake cylinder exhaust passage 55 containing a brake cylinder exhaust choke 56. With passage 19 thus maintained open to atmosphere, control chamber 32 of valve device 8 will be maintained vented via passage 31, cavity 30 of service valve 21 in brake release position and a branch of passage 19, for thereby assuring that the control valve 39 will be maintained in its normal position throughout initial charging.

Meanwhile, some of the fluid supplied to the brake pipe 2 will flow via a branch of passage 14 to the underside of an auxiliary reservoir charging check valve 57 and unseat said check valve against resistance of a helical bias spring 58 and then flow past said check valve and through an auxiliary reservoir fast charge choke 59 to a branch of auxiliary reservoir passage 49 for charging the auxiliary reservoir 4 at a relatively fast rate until auxiliary reservoir pressure has increased to a value within about 1.5 p.s.i. below brake pipe pressure, as determined by the selected value of spring 58; whereupon check valve 57 will be seated for terminating fast charging of the auxiliary reservoir via the fast charge communication just described.

Meanwhile, fluid under pressure will also flow from the brake pipe 2 to the auxiliary reservoir via an auxiliary reservoir slow charge communication, arranged in parallel with the fast charge communication just described, and defined by slow charge choke 48, passage 47, cavity 43 of control valve 39 in normal position, and a branch of passage 49; said slow charge communication permitting the auxiliary reservoir 4 to be charged to full equalization with brake pipe pressure after seating of the check valve 57.

To effect an application of brakes, pressure of fluid in the brake pipe 2 is reduced at the locomotive in the a well known manner. According to the invention, when, on a particular car, brake pipe pressure as noted in chamber 13 of service valve device 7 has been reduced a chosen slight degree, such as the aforementioned 0.7 p.s.i., control reservoir pressure in chamber 11 will shift movable abutment 9 upwardly and, through the medium of pusher stem 15, correspondingly shift movable abutment 10 against resistance of the light spring 26, for thereby shifting service valve 21 to a quick service position, in which spring retainer 29 engages the end wall of chamber 18 but does not effect compression of the spring 27. During movement of service valve 21 to this position, valve cavity 32a is carried out of registry with control reservoir passage 12 for promptly closing the control reservoir charge communication and preventing backflow from the control reservoir 3 and chamber 11 into the brake pipe via the choke 46; and also valve cavity 30 is carried out of registry with passage 19 for closing off control chamber 32 of valve device 8 from the then vented brake cylinder 5. With service valve 21 in this quick service position, valve cavity 32a will connect the charged volume 34 with a branch of passage 31 for thereby charging the control chamber 32 of valve device 8 and causing diaphragm 35 to deflect against resistance of the light spring 36 and shift control valve 39 to another position, defined by contact of the follower 38 with a stop formed in the end wall of chamber 37.

With valve 39 in this position, passage 45 is lapped for secondarily closing the control reservoir charge communication, previously closed during movement of service valve 21 to its quick service position, as above explained; passage 49 is lapped for closing the previously defined auxiliary reservoir slow charge communication; and a branch of brake pipe passage 14 is connected via valve cavity 44 to passage 53 for causing a local quick service reduction in brake pipe pressure upon equalization of brake pipe pressure into the previously vented quick service volume 54.

A choke 60 is preferably provided in passage 53 for restricting the rate of quick service reduction in brake pipe pressure so as to prevent an undesired emergency application of brakes if the brake controlling valve device comprises an emergency portion responsive to an emergency rate of brake pipe pressure reduction to effect an emergency application of brakes.

When brake pipe pressure in chamber 13 has reduced a preselected degree, such as about 3 p.s.i., below control reservoir pressure in chamber 11, the latter pressure will be effective to shift the service stack upwardly against the combined resistance of springs 26 and 27 and auxiliary reservoir pressure and the pressure of spring 52 acting on valve 51, for thereby shifting service valve 21 to a brake application position, in which the projecting end of valve 21 abuttingly engages valve 51 and holds same unseated against resistance of spring 52. With valve 21 in this position, fluid under pressure will flow from the auxiliary reservoir 4 to the brake cylinder 5 via passage 49, chamber 50, past unseated valve 51 to chamber 23, and thence via passage 19 at the rate controlled by brake cylinder application choke 20. Some of the fluid thus supplied to the brake cylinder 5 will flow via a branch of passage 19 and the usual baffle choke 61 to chamber 18.

The effective area of movable abutment 9 is preferably about 2.9 times the effective area of movable abutment 10, so that for each p.s.i. that brake pipe pressure is reduced (in excess of the aforementioned preselected 3 p.s.i. bias) below control reservoir pressure, a brake cylinder pressure of 2.9 p.s.i. will be obtained. Hence, when brake cylinder pressure as noted in chamber 18 has increased, accordingly to this proportion, to a degree corresponding to the operator-effected reduction in brake pipe pressure, the service stack will be shifted downwardly and thereby carry the service valve 21 to a lap position, which is intermediate its brake application position and its quick service position, and in which the projecting end of valve 21 sealingly engages the valve 51 and the latter valve is held seated by auxiliary reservoir pressure in chamber 50 and pressure of spring 52. With valve 21 in lap position, fluid will be bottled up in the brake cylinder 5 at a pressure corresponding to the operator-effected reduction in brake pipe pressure.

The cavity 32a is preferably of sufficient axial length to connect the passage 31 to the volume 34 in brake application position and lap position (as well as quick service position) of the service valve 21 so that chamber 32 will be maintained in its said other position by volume pressure in event of slight leakage.

To effect a release of brakes, brake pipe pressure is increased at the locomotive in the well known manner. This increase in brake pipe pressure, as noted in chamber 13 of service valve device 7 on a particular car, is effective in cooperation with brake cylinder pressure in chamber 18 to shift the service stack downwardly against opposing control reservoir pressure in chamber 11 and thereby carry the service valve 21 through its quick service position to its brake release position, in which it is shown.

According to a feature of the invention, during this movement of service valve 21 to brake release position, the cavity 32a will successively disconnect volume 34 from passage 31 and chamber 32 and then connect control reservoir passage 12 to volume 34, thereby causing control reservoir pressure to be reduced a slight degree for insuring that the service valve will tend to stay in brake release position and not cycle, despite a slight fluctuation in brake pipe pressure; such slight reduction permitting graduated release of brakes because it is of insufficient magnitude to positively bias the service stack to brake release position and thereby cause a full direct release of brakes. It is to be noted, however, that if this insuring feature is not desired, the volume 34 may be charged from another source, such as the brake pipe 2 or auxiliary reservoir 4.

Also, with service valve 21 in brake release position, fluid under pressure will be vented from the brake cylinder 5 via choke 20, passage 19, chamber 23, opening 24, valve cavity 25, passage 55 and brake cylinder exhaust choke 56, at the rate controlled by said chokes; and fluid under pressure will be released from chamber 32 of device 8 via passage 31, valve cavity 32a and a branch of passage 19.

If brake pipe pressure is only partially restored toward its normal charge value, in order to effect a graduated release of brakes, then the service valve 21 will be shifted to lap position when brake cylinder pressure has been reduced to a value corresponding to the operator-effected increase in brake pipe pressure; and so long as brake cylinder pressure exceeds a chosen slight value, such as about 2 p.s.i., as determined by the bias effect of spring 36, the control valve 39 will be maintained in its said other position for thereby maintaining the previously defined auxiliary reservoir slow charge communication and control reservoir charge communication closed and the quick service volume 54 closed off from atmospheric port 41. On the other hand, if brake pipe pressure is fully restored for causing a full direct release of brakes, the service valve 21 will remain in brake release position, thereby completing venting the brake cylinder 5 and hence the chamber 32 of device 8, with the result that the spring 36 will shift the valve 39 to its normal position, for successively closing off the quick service volume 54 from brake pipe passage 14 and then venting said volume to atmospheric port 41 and also reopening the auxiliary reservoir slow charge communication and control reservoir charge communication for permitting recharging of the auxiliary reservoir 4 and control reservoir 3 to equality with brake pipe pressure.

Upon any increase in brake pipe pressure, whether in effecting a graduated or full release of brakes, the auxiliary reservoir 4 will of course be recharged to within the illustrative 1.5 p.s.i. of brake pipe pressure by flow of brake pipe fluid past the check valve 57 and through choke 59; said choke 59 serving to restrict the rate of recharging of the auxiliary reservoir sufficiently to prevent excessive depletion of the brake pipe pressure head at the rear of the train, such as would otherwise be caused if the auxiliary reservoirs on the forward cars were permitted to be charged at an unrestricted rate.

Having now described the invention, what I claim as new and desire to secure by Letters Patent, is:

1. A fluid pressure brake apparatus comprising, in combination, a normally charged brake pipe, a control reservoir, means defining a normally open charging communication connecting said brake pipe and control reservoir, a normally vented brake cylinder, and a service valve device comprising movable abutment means controlled by control reservoir pressure opposing brake pipe pressure and brake cylinder pressure and valve means mechanically operatively connected to said movable abutment means, said movable abutment means being responsive to an initial slight reduction in brake pipe pressure below control reservoir pressure to mechanically position said valve means to cause the latter to close said charging communication and responsive to a chosen further reduction in brake pipe pressure to mechanically position said valve means to effect supply of fluid under pressure to said brake cylinder.

2. A fluid pressure brake apparatus comprising, in combination, a normally charged brake pipe, a control reservoir, means defining a charging communication through which fluid under pressure may flow between said brake pipe and control reservoir, an auxiliary reservoir, a brake cylinder, self-lapping type service valve device comprising a pair of movable abutments controlled by control reservoir pressure opposing brake pipe pressure and brake cylinder pressure, a slide valve positively connected to one of said movable abutments, and a poppet-type brake cylinder supply valve, said movable abutments being normally positioned for permitting closure of said supply valve and causing said slide valve to vent said brake cylinder and permit flow through said charging communication, said movable abutments being responsive to an initial slight reduction in brake pipe pressure below control reservoir pressure to cause said slide valve to close said charging communication and responsive to a chosen further reduction in brake pipe pressure below control reservoir pressure to cause said slide valve to terminate venting of the brake cylinder and then mechanically open said supply valve for supplying fluid under pressure from said auxiliary reservoir to said brake cylinder.

3. A fluid pressure brake apparatus comprising, in combination, a normally charged brake pipe, a control reservoir, means defining a normally open charging communication connecting the brake pipe and control reservoir, a brake cylinder, service valve means controlled by control reservoir pressure opposing brake pipe pressure and brake cylinder pressure and responsive to an initial slight reduction in brake pipe pressure below control reservoir pressure to one position to close said charging communication and responsive to a chosen greater reduction in brake pipe pressure below control reservoir to move to a brake application position to effect supply of fluid under pressure to the brake cylinder, and other valve means operable responsively to movement of said service valve means to said one position to additionally close said charging communication, said service valve means and other valve means being arranged to serially control flow through said charging communication.

4. A fluid pressure brake apparatus, comprising, in combination, a brake pipe, a control reservoir, means defining a normally open charging communication for permitting equalization of control reservoir pressure with brake pipe pressure, means defining a brake controlling communication to which fluid under pressure is supplied for causing an application of brakes and from which fluid under pressure is released for causing a release of brakes, means defining a chamber, service valve means controlled by control reservoir pressure opposing brake pipe pressure and brake controlling communication pressure and normally in a brake release position for releasing fluid under pressure from said brake controlling communication and said chamber at a restricted rate and responsive to a chosen slight reduction in brake pipe pressure below control reservoir pressure to close said charging communication and terminate venting of said chamber and then supply fluid under pressure to said chamber, said service valve means being responsive to a chosen greater reduction in brake pipe pressure below control reservoir pressure to terminate venting of said brake controlling communication and then supply fluid under pressure to said brake controlling communication, and other valve means normally in one position and responsive to charging of said chamber to additionally close said charging communication, whereby said charging communication will be maintained closed despite operation of said service valve means to its brake release position until said other valve means moves to its said one position responsively to venting of said chamber.

5. A fluid pressure brake apparatus comprising, in combination, a normally charged brake pipe, a quick service volume, means defining a normally open flow connection via which fluid under pressure is released from said quick service volume, an auxiliary reservoir, means defining a normally open charging communication for permitting equalization of auxiliary reservoir pressure with brake pipe pressure, valve means having a chamber and responsive to charging of said chamber to close said flow connection and said charging communication and then open the brake pipe to said quick service volume for effecting a quick service reduction in brake pipe pressure, a brake cylinder, and valve means normally venting said brake cylinder and said chamber and responsive to a slight reduction in brake pipe pressure below normal charge value to effect supply of fluid under pressure to said chamber and responsive to a chosen greater reduction in brake pipe pressure below normal charge value to effect supply of fluid under pressure from said auxiliary reservoir to the brake cylinder.

6. A fluid pressure brake apparatus comprising, in combination, a normally charged brake pipe, a control reservoir, means defining a normally open charging communication connecting the brake pipe and control reservoir, a quick service volume, means defining a normally open flow connection via which fluid under pressure is released from said quick service volume, means defining a chamber, a brake cylinder, service valve means controlled by control reservoir pressure opposing brake pipe pressure and brake cylinder pressure and normally in a brake release position for releasing fluid under pressure from said brake cylinder and chamber at a restricted rate, and responsive to a slight initial reduction in brake pipe pressure relative to control reservoir pressure to close said charging communication and supply fluid under pressure to said chamber and responsive to a greater reduction in brake pipe pressure relative to control reservoir pressure to supply fluid under pressure to the brake cylinder, and other valve means operative responsively to charging of said chamber for closing said flow connection and also secondarily closing said charging communication and then connecting the brake pipe to said quick service volume for causing a quick service reduction in brake pipe pressure, whereby said charging communication will be maintained closed despite subsequent movement of said service valve means to its brake release position unless and until said chamber is substantially vented.

7. A fluid pressure brake apparatus comprising, in combination, a normally charged brake pipe, a control reservoir, means defining a normally open charging communication connecting the brake pipe and control reservoir, a quick service volume, means defining a normally open flow connection via which fluid under pressure is released from said quick service volume, means defining a chamber, a brake cylinder, another volume, service valve means controlled by control reservoir pressure opposing brake pipe pressure and brake cylinder pressure and normally in a brake release position for connecting the brake cylinder to atmosphere via a restriction while also connecting said chamber to the brake cylinder and connecting said other volume to the control reservoir, said service valve means being responsive to a slight initial reduction in brake pipe pressure relative to control reservoir pressure to successively close said charging communication and cut off the control reservoir from said other volume and close off said chamber from said brake cylinder and then supply fluid under pressure from said other volume to said chamber and responsive to a greater reduction in brake pipe pressure relative to control reservoir pressure to successively close off the brake cylinder from atmosphere and then supply fluid under pressure to said brake cylinder, and combined quick service and charging control means responsive to charging of said chamber to successively close said charging communication and flow connection and then open the brake pipe to said quick service volume, whereby said control means will maintain said charging communication closed unless and until said chamber is substantially vented despite intervening movement of said service valve means to brake release position.

8. A fluid pressure brake apparatus comprising a brake pipe, a control reservoir, an auxiliary reservoir, means defining separate normally open charging communications connecting the brake pipe with the control reservoir and with the auxiliary reservoir, a brake cylinder, means defining a normally vented chamber, service valve means controlled by control reservoir pressure opposing brake pipe pressure and brake cylinder pressure and responsive to a slight initial reduction in brake pipe pressure relative to control reservoir pressure to one position to close one of said charging communications and terminate venting of said chamber and then supply fluid under pressure to said chamber and responsive to a greater reduction in brake pipe pressure relative to control reservoir pressure to supply fluid under pressure from the auxiliary reservoir to the brake cylinder, and other valve means responsive to charging of said chamber to close the other of said communications and additionally close said one communication.

9. A fluid pressure brake apparatus comprising a normally charged brake pipe, a control reservoir, an auxiliary reservoir, means defining a first normally open restricted charging communication connecting the brake pipe and control reservoir, means defining a second normally open restricted charging communication connecting the brake pipe and auxiliary reservoir, a quick service volume, means defining a normally open flow connection via which fluid under pressure is released from said quick service volume, means defining a chamber, a brake cylinder, service valve means controlled by control reservoir pressure opposing brake pipe pressure and brake cylinder pressure and normally positioned for releasing fluid under pressure from said brake cylinder and chamber to atmosphere at a restricted rate and operative to another position responsively to a slight initial reduction in brake pipe pressure relative to control reservoir pressure to close said first communication and close off such chamber from atmosphere and then supply fluid under pressure to said chamber and responsive to a chosen further reduction in brake pipe pressure relative to control reservoir pressure to supply fluid under pressure from said auxiliary reservoir to said brake cylinder, and other valve means responsive to charging of said chamber to close said second communication and flow connection and secondarily close said first communication and then open said quick service volume to the brake pipe.

10. The combination according to claim 9, including flow restricting means interposed between the brake pipe and quick service volume for assuring against an undesired emergency rate of quick service reduction in brake pipe pressure.

11. The combination according to claim 10, including another volume, and wherein said service valve means in its normal position permit fluid flow from said control reservoir to said other volume for charging the latter and in its said other position supplies fluid under pressure from said other volume to said chamber.

12. A fluid pressure brake apparatus comprising, in combination, a normally charged brake pipe, a control reservoir containing fluid at the normal charge value of brake pipe pressure, an auxiliary reservoir, a brake cylinder, a normally vented quick service volume other than the brake cylinder, a valve controlling connection of the quick service volume with the brake pipe, valve means, and a plurality of operatively connected movable abutments arranged in a stack for controlling operation of said valve means, said stack being subject to control reservoir pressure opposing brake pipe pressure and brake cylinder pressure, a light spring constantly effective for normally urging said stack in one direction against opposition of control reservoir pressure to shift said valve means to a brake release position for venting the brake cylinder and causing said valve to operate to close off said quick service volume from the brake pipe, and a heavier spring carried by one of said movable abutments and retained to limit the extent of its expansion in the opposite direction, said stack being responsive to a slight reduction in brake pipe pressure relative to control reservoir pressure to move against resistance of said first spring to a position wherein said heavier spring engages a stop but is not compressed and wherein said valve means is so positioned as to cause said valve to operate to connect said quick service volume to the brake pipe for effecting a local quick service reduction in brake pipe pressure, said stack being responsive to a further reduction in brake pipe pressure relative to control reservoir pressure to move against resistance of both of said springs to a brake application position for causing said valve means to supply fluid under pressure from said auxiliary reservoir to said brake cylinder for applying brakes to a degree corresponding to such further reduction in brake pipe pressure.

References Cited in the file of this patent

UNITED STATES PATENTS

| | | |
|---|---|---|
| 851,273 | Blackall | Apr. 3, 1907 |
| 2,034,328 | Campbell | Mar. 17, 1936 |
| 2,376,680 | Gallusser | May 22, 1945 |
| 2,661,248 | Keller | Dec. 1, 1953 |
| 2,707,134 | Cook | Apr. 26, 1955 |

FOREIGN PATENTS

| | | |
|---|---|---|
| 712,596 | Great Britain | Dec. 23, 1952 |